United States Patent
Shahraray et al.

(10) Patent No.: US 10,102,284 B2
(45) Date of Patent: *Oct. 16, 2018

(54) SYSTEM AND METHOD FOR GENERATING MEDIA BOOKMARKS

(71) Applicant: AT&T Intellectual Property I, L.P., Atlanta, GA (US)

(72) Inventors: Behzad Shahraray, Holmdel, NJ (US); Andrea Basso, Turin (IT); Lee Begeja, Gillette, NJ (US); David Crawford Gibbon, Lincroft, NJ (US); Zhu Liu, Marlboro, NJ (US); Bernard S. Renger, New Providence, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/463,549

(22) Filed: Mar. 20, 2017

(65) Prior Publication Data

US 2017/0193103 A1 Jul. 6, 2017

Related U.S. Application Data

(63) Continuation of application No. 15/099,267, filed on Apr. 14, 2016, now Pat. No. 9,613,143, which is a continuation of application No. 14/737,683, filed on Jun. 12, 2015, now Pat. No. 9,342,596, which is a continuation of application No. 14/181,963, filed on Feb. 17, 2014, now Pat. No. 9,058,386, which is a
(Continued)

(51) Int. Cl.
*G06F 17/00* (2006.01)
*G06F 17/30* (2006.01)

(52) U.S. Cl.
CPC .. *G06F 17/30784* (2013.01); *G06F 17/30849* (2013.01)

(58) Field of Classification Search
CPC ......... G06F 17/30884; G06F 17/30843; G06F 17/30846; G06F 17/30784; G06F 17/30781; H04N 9/80; H04N 21/8455
See application file for complete search history.

(56) References Cited

U.S. PATENT DOCUMENTS 7,143,353 B2 11/2006 McGee
8,051,081 B2 11/2011 Shahraray et al.
(Continued)

*Primary Examiner* — Cheryl Lewis

(57) ABSTRACT

Disclosed herein are systems, methods, and computer-readable media for transmedia video bookmarks, the method comprising receiving a first place marker and a second place marker for a segment of video media, extracting metadata from the video media between the first and second place markers, normalizing the extracted metadata, storing the normalized metadata, first place marker, and second place marker as a video bookmark, and retrieving the media represented by the video bookmark upon request from a user. Systems can aggregate video bookmarks from multiple sources and refine the first place marker and second place marker based on the aggregated video bookmarks. Metadata can be extracted by analyzing text or audio annotations. Metadata can be normalized by generating a video thumbnail representing the video media between the first place marker and the second place marker. Multiple video bookmarks may be searchable by metadata or by the video thumbnail visually.

18 Claims, 6 Drawing Sheets

Related U.S. Application Data continuation of application No. 13/284,159, filed on Oct. 28, 2011, now Pat. No. 8,655,879, which is a continuation of application No. 12/192,732, filed on Aug. 15, 2008, now Pat. No. 8,051,081.

(56) References Cited

U.S. PATENT DOCUMENTS

| | | |
|---|---|---|
| 8,655,879 B2 | 2/2014 | Shahraray et al. |
| 9,058,386 B2 | 6/2015 | Shahraray et al. |
| 9,342,596 B2 | 5/2016 | Shahraray et al. |
| 9,613,143 B2 * | 4/2017 | Shahraray ........... G06F 17/3082 |
| 2003/0016951 A1 | 1/2003 | Jakel et al. |
| 2005/0038794 A1 | 2/2005 | Piersol et al. |
| 2006/0080716 A1 | 4/2006 | Nishikawa et al. |
| 2007/0078713 A1 | 4/2007 | Ott et al. |
| 2010/0027966 A1 | 2/2010 | Harrang et al. |

* cited by examiner

SYSTEM AND METHOD FOR GENERATING MEDIA BOOKMARKS

CROSS-REFERENCE TO RELATED APPLICATIONS

This application is a continuation of and claims priority to U.S. patent application Ser. No. 15/099,267, filed Apr. 14, 2016, U.S. patent application Ser. No. 14/737,683, filed Jun. 12, 2015, now U.S. Pat. No. 9,342,596, issued May 17, 2016 which is a continuation of U.S. patent application Ser. No. 14/181,963, filed Feb. 17, 2014, now U.S. Pat. No. 9,058, 386, issued Jun. 16, 2015, which is a continuation of U.S. patent application Ser. No. 13/284,159, filed Oct. 28, 2011, now U.S. Pat. No. 8,655,879, issued Feb. 18, 2014, which is a continuation of U.S. patent application Ser. No. 12/192, 732, filed Aug. 15, 2008, now U.S. Pat. No. 8,051,081, issued Nov. 1, 2011. The contents of the foregoing are hereby incorporated by reference into this application as if set forth herein in full.

FIELD OF THE DISCLOSURE

The present invention relates to media playback and more specifically to video bookmarks to aid in pausing and resuming video playback.

INTRODUCTION

Video consumption has traditionally been a very passive activity. In the beginning era of video, viewers watched a movie when the theater decided to show it. Later, the invention of television allowed viewers to watch a television program in the comfort of their home, but viewers were still forced to watch programs as they were broadcast. With the advent of video cassette tape technology such as Betamax or VHS, viewers were able to record and watch video content on demand, but tethered to locations that included bulky video cassette players and viewers were tied to physical removable media. Recent years have seen rapid changes. Video content is now available on many devices, portable and otherwise. Video content can be stored on removable media, such as DVD or USB flash drives, or on internal storage, such as a hard drive or flash memory in an iPod, or streamed via a network, such as to a computer or cellular phone. Video content is available and portable nearly anywhere in some form or another. TiVO and other digital video recorders allow viewers to automatically record broadcasts and even pause live television.

With all the progress made in distributing and presenting video content on individual devices, little progress has been made to free content which is limited to a particular device or format and provide continuous playback across devices and formats. Accordingly, what is needed in the art is a way for users to mark and shift video content from device to device freely and easily.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed herein are systems, methods, and computer-readable media for generating video bookmarks, the method comprising receiving a first place marker and a second place marker for a segment of video media, extracting metadata from the video media between the first and second place markers, normalizing the extracted metadata, storing the normalized metadata, first place marker, and second place marker as a video bookmark, and retrieving the media represented by the video bookmark upon request from a user. One aspect further aggregates video bookmarks from multiple sources and refines the first place marker and second place marker based on the aggregated video bookmarks. Metadata can be extracted by analyzing text or audio annotations. Another aspect of normalizing the extracted metadata includes generating a video thumbnail representing the video media between the first place marker and the second place marker. Multiple video bookmarks may be searchable by metadata or by the video thumbnail visually. In one aspect a user profile stores video bookmarks on a per media and per user basis.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION OF THE DRAWINGS

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
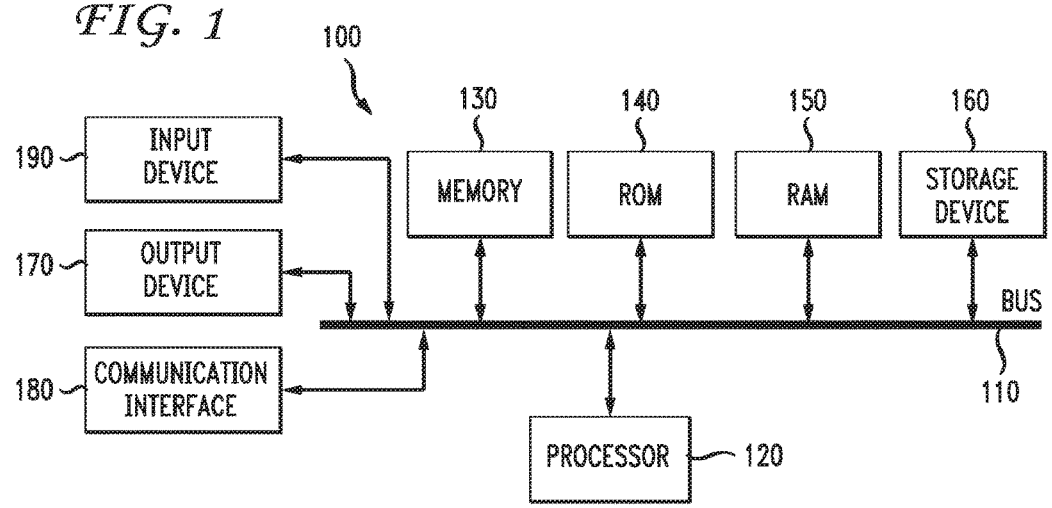
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
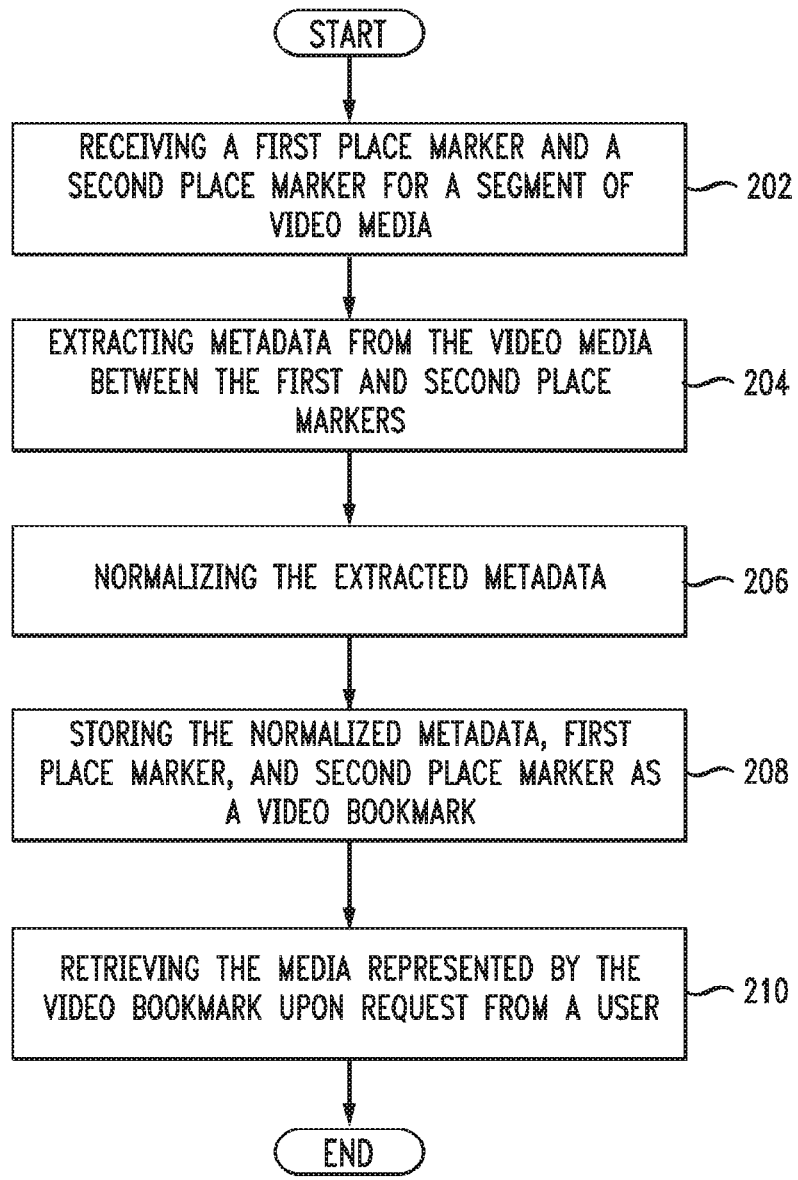
FIG. 2 illustrates a sample method embodiment.

FIG. 2 illustrates a sample method embodiment. One application of this method is to mark favorite parts of video clips as video bookmarks. One way to indicate a favorite part is to demarcate the start point and end point of the favorite part of the video relative to some other position in the video, such as the absolute beginning or ending of the video clip. The first step in the method includes receiving a first place marker and a second place marker for a segment of video media (202). The first place marker and the second place marker may mark the same location, which would effectively generate a video clip of a still picture. This aspect works conceptually because videos are composed of a series of still pictures played in succession, making a still picture a subset of a video. In one implementation of the method, a user watches a television show and clicks a button on a remote control which sends a signal to a receiving device indicating the beginning of a clip she likes. The user later clicks the same or another button indicating the end of the clip. The first place marker is the beginning of the clip and the second place marker is the end of the clip. The place markers may be automatically modified to account for real life situations and real life human response time. Human response time is not instantaneous. A delay, small or large, is introduced between the beginning of the clip and when the viewer actually clicks the button indicating the place mark. An automatic way to adjust the place marks is to account for a 2-5 second delay (or other variable amount of time) if the user is consistently slightly behind in making the first place mark. The place markers may be manually edited to slide forward or backward if they are in an incorrect location. A blended automatic and manual system may rely on previously detected divisions or chapters in the video content and suggest a place mark based on where the user has marked and, for example, the nearest division or chapter. Another approach would be to suggest the next earliest division or chapter from the user-indicated place mark rather than the nearest which could be after the portion the user intended to mark. As is discussed further, collaborative or aggregated place marks may contribute to locating an intended location for a place mark.

The second step in the method includes extracting metadata from the video media between the first and second place markers (204). Extracted metadata is not limited to data located only between the first and second place markers. Metadata includes state information about the current playback device. For example, one piece of metadata is the volume of the television set or the playback size of a MPEG video (actual size, 2.times., full screen, etc). Inasmuch as the marked portion is a sub-segment of a larger video segment, any metadata describing the larger video segment is considered metadata about the video media between the first and second place marks. For example, the first place marker is set at the beginning of Luke Skywalker's encounter with Darth Vader in Star Wars: The Empire Strikes Back and the second place marker is set just after Skywalker's hand is cut off Although the video content between the two place markers does not explicitly mention or display the movie title, the director, the running length, or genre, etc. all such metadata may be included as describing the context of the video clip.

In one aspect, the exemplary system extracts metadata through analysis of speech, audio, alternate audio tracks (in the case of a DVD with director commentary, actor commentary, etc), sub-titles, available camera angles, individual frames, etc. Metadata may be extracted from each component of the source video clip in a different way. For example, speech can be converted to text by a speech recognition unit, individual frames can be analyzed to identify key objects or persons, and so forth.

In one aspect of the method, one or more users provide audio or text annotations which are analyzed to extract additional metadata. Especially in the context of home videos, videos taken with a cameraphone and the like, this additional metadata can be critical because other metadata is sparse and not very descriptive. Audio annotations may be retained in audio format and mixed over any audio contained in the video clip, much like personalized director commentary for home made videos.

Once the metadata is extracted, the third step in the method includes normalizing the extracted metadata (206). Metadata is normalized when it is molded to adhere to a uniform or standard format, such as MPEG-7 or MPEG-21. After metadata is normalized, playback becomes possible on multiple devices, but may require further transcoding of the original media to suit the target playback device. Dates are a prime example of metadata which occurs in multiple formats and requires normalization. Assume that a preferred normalized format for a date is 01-01-2000. The normalization process takes dates in other formats, such as Jan. 1, 2000; 1/1/00; Saturday, January First, Two Thousand A.D.; and Jan-1-2000; and adjusts them to match the chosen standard form. Uniformity and consistency allows for simplified searching and indexing of the metadata. The need for normalization is further heightened when dealing with metadata extracted from audio or text annotations provided by users. Individuals often use different roughly synonymous words to describe things, and different regions have different jargon and vocabulary. For example, sandals are called many names in different regions: sandal, thong, flip-flop, slipper, etc. When such a word is encountered, it is normalized to a predefined term. Other established meanings of the word normalization also apply.

In one aspect, the system generates a video thumbnail representing the video media between the first place marker and the second place marker. A video thumbnail is a graphical shorthand representation of the video between the markers. The video thumbnail is a series of pointers to frames in the original content or the video thumbnail can be a separately generated and stored, such as an animated GIF file, a QuickTime video, or an Adobe Flash file. A video thumbnail can be a fixed length regardless of the length of the video between the first and second place marks. A video thumbnail can be a variable length, such as some fraction of the length of the video between the first and second place marks or the variable length may be determined by a number of unique scenes in the video between the first and second marks. A video thumbnail can be full motion video of select portions of the video or it can be one or more still frames from the video. Video thumbnails may or may not include sound. In one aspect, a full motion video and a still frame are included to account for playback devices that can and can not display full motion video.

The fourth step in the method includes storing the normalized metadata, first place marker, and second place marker as a video bookmark (208). In one aspect video bookmarks are text searchable. For example, a cell phone stores multiple video bookmarks and the user searches them using the term "Christmas". Traditional, known in the art text searching techniques may be applied to search through the metadata for each video clip and retrieve the ones that match the search term. The system retrieves video clips containing "Christmas" in the meta-data, as well as video clips showing Santa Clause, decorated evergreen trees, reindeer and snow, etc. and video clips containing the spoken word "Christmas" or "December Twenty Fifth". Wild cards, regular expressions, root expanders, etc. can be used to assist in text searching. The system displays a list of video thumbnails visually to a user and animation, if available, is played to show a user what is contained in each clip. When animation is not present for a video bookmark, the system displays a still picture representing the clip contents. A visual display may include a combination of scrolling metadata text and a visual display for each video bookmark to provide additional information for a user to select a video bookmark for playback.

Video bookmarks may be stored in a central location, embedded within the media itself, automatically saved on a device, saved as a separate file where a user instructs that the video bookmark be saved or distributed across multiple devices, etc. When a video bookmark is stored across multiple devices, each of the multiple devices may be determined as likely to play back the video bookmark. Video bookmarks may be stored, copied, and transferred from device to device. In one embodiment, a separate file is created to store a video bookmark per video per user.

The fifth step in the method is retrieving the media represented by the video bookmark upon request from a user (210). The media content can be embedded in a video bookmark as a standalone file or the video bookmark may contain links to another video source, such as a video file stored on a hard drive or a video file or video stream available through a network or through the Internet. Video bookmarks can be played back on any device independent of what device was used for original playback or making the first and second place markers. For example, a user sets a video bookmark on the home television set, starts his or her daily commute on the bus, and retrieves the video bookmark to resume playback or view the video bookmark content on his or her Internet-enabled cellular phone or PDA as he or she is riding on the bus.

One aspect of invention further includes aggregating video bookmarks from multiple sources and refining the first place marker and second place marker based on the aggregated video bookmarks. For example, many viewers watch a broadcast television show and multiple individuals mark the same or approximately the same portion as a portion of interest with a video bookmark, such as an especially funny part of a comedy. Each of the video bookmarks is transmitted to a central server which analyzes the aggregated multiple first place markers and makes a determination as to where the "correct" or most likely intended first place marker is and adjusts the first place marker of each of the aggregated video bookmarks accordingly. The same is done for the second place marker. Metadata in aggregated video bookmarks is updated in a similar fashion by adding missing metadata in video bookmarks that is present in a majority of like video bookmarks. Aggregated video bookmarks may be searchable from the central server or may be sent back to other devices for storage, searching, and retrieval.

In another aspect, a user profile is used to store video bookmarks on a per media and on a per user basis. For example, in a home media library, more than one user can be in various stages of watching the same movie. A video bookmark for Joe's session watching Movie #1 is stored in a way that keeps it separate from Matt's session watching Movie #1. Similarly, Joe's session watching Movie #1 is kept separate from Joe's session watching Movie #2. Multiple bookmarks may be stored per user per media as well. A user may mark several places within an individual movie file with a video bookmark. Joe keeps bookmarks for his favorite funny parts of Movie #1 and keeps a separate bookmark for where he last stopped playback.

The method described and shown in FIG. 2 may be implemented in a live opportunistic mode or as a service in batch mode. Live opportunistic mode processes video bookmarks, metadata, and annotations on the fly, whereas batch mode gathers or queues a group of projects and processes each project at some later date. One example of batch mode allows a user to mark interesting portions of a movie, but abstains from interrupting the movie to process them or asks the user to add an audio annotation after the movie is over.

Video bookmarks may be generated automatically to provide a short synopsis to remind a user what transpired in a video presentation that has been paused or stopped just before resuming playback. This aspect acts much like the short 1 or 2 minute episode recaps that are often shown right before the second half of a cliffhanger episode to remind viewers of what happened in the first half which was shown 3 months prior.

Figure 3:
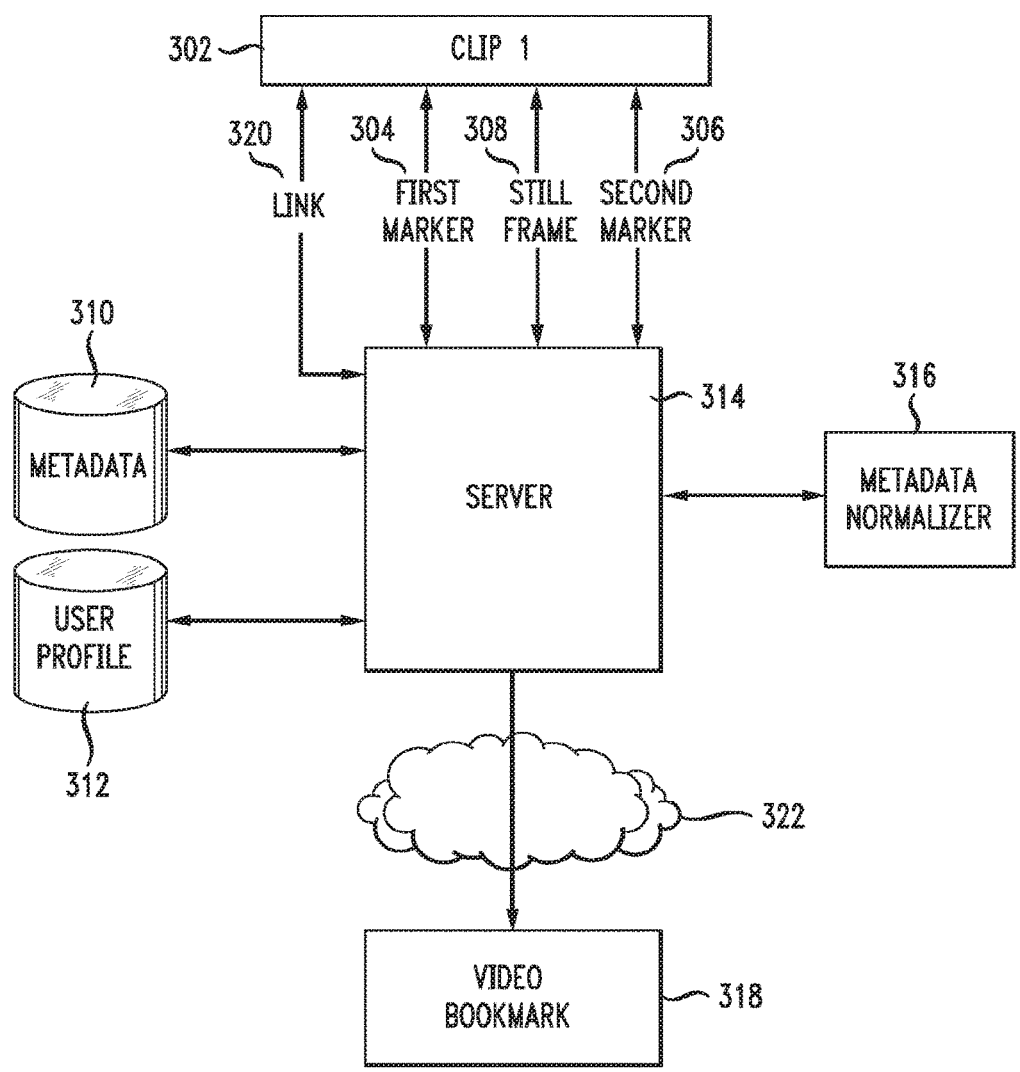
FIG. 3 illustrates sample system embodiment for generating video bookmarks.

FIG. 3 illustrates a sample system or network-based embodiment. Clip 1 302 is the video clip from which a video bookmark is being generated. The user sets the first marker 304 indicating the intended beginning of the video bookmark and sets a second marker 306 indicating the intended ending of the video bookmark. The user may indicate a still frame 308 which the user feels is representative of the entire clip 1 302. The server also retrieves video content from clip 1 to generate a video thumbnail. The server 314 extracts metadata 310, including any user audio or text annotations, and user profile 312 information. The first marker 304, second marker 306, and still frame 308 are sent to the server 314 as well. The server normalized metadata with a metadata normalizer 316 module. In one embodiment, the metadata normalizer contains a table of predefined formats. In another embodiment, the metadata normalized evolves and learns metadata formats on the fly based on metadata from one or more users. The server then combines the first marker 304, the second marker 306, the still frame 308, the video thumbnail, user profile information, and normalized metadata into a single file called the video bookmark 318. The server 314 can also add a link 320 to the original video clip in place of the original video clip 302 to conserve bandwidth and/or storage space when distributing and/or storing the video bookmark, however a link is primarily useful with online playback devices. The video bookmark can be transmitted and stored on a playback device through a network 322 such as a home network, a wireless network, the Internet, a corporate intranet, etc. The network is depicted in a representative location. All or some of the components pictured may be located in or across a network. Components may be divided and located partially locally and partially in a network. In the case of data storage, such as the metadata 310 and user profile 312, duplicate storage which can be synchronized from time to time can be located inside and/or outside the network.

The video bookmark is transferable between video formats and between playback devices. In one aspect it serves as a universal indicator of the marked video segment regardless of the format, medium, playback location, and playback device. In one aspect, the video bookmark is stored on a server for access by network-enabled playback devices. The video bookmark can also be synced to an offline playback device. A user can even attach the video bookmark to an email message for mass distribution. In one embodiment, a list of video bookmarks is stored on a playback device and functions much like a list of favorites or bookmarks in a web browser.

Figure 4:
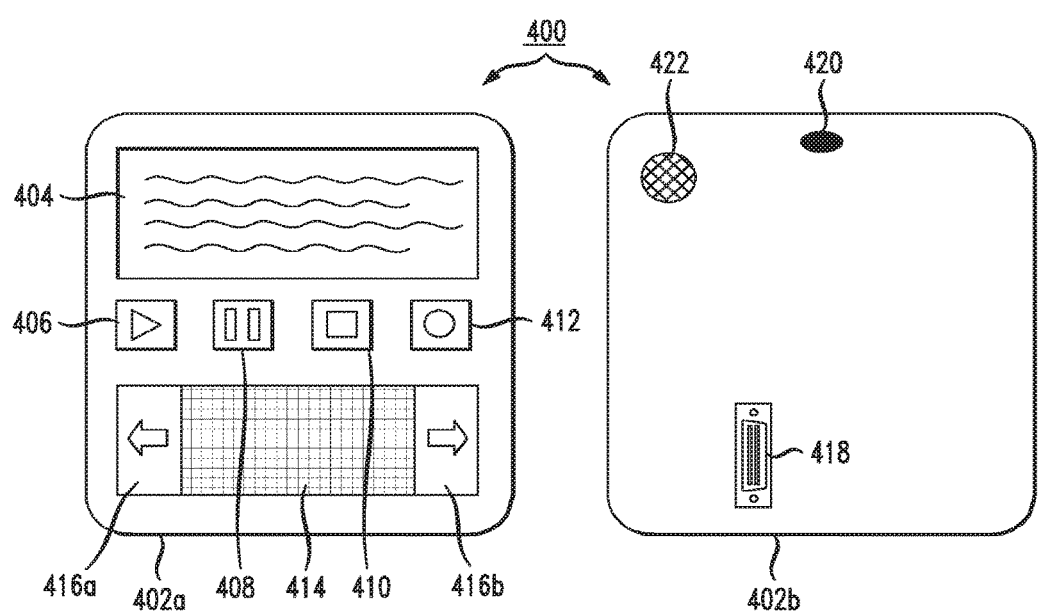
FIG. 4 illustrates a sample remote control device for use with a sample system.

FIG. 4 illustrates a remote control device 400 for user interaction with a sample system. Such a remote control device may interact with a television set-top box, a personal digital video recorder, a personal computer, video game console, etc. It may even be integrated into a mobile telephone. The front 402a of the remote control has displays and user interfaces. The back 402b of the device has user interfaces, but no display. The display 404 is capable of showing text as it is entered into the remote or may be capable of displaying the video or still frames as they are being marked. Common purpose buttons such as play 406, pause 408, stop 410, and record 412 are featured to allow for easy manipulation of place markers within the video content. For example, a user may hit the record button 412 to signify the first marker and the stop button to signify the second marker. After the user has set two marks, the user is prompted on the display 404 to enter a description or metadata about the marked portion of video on the included keyboard 414. The user may manually alter the first and second markers using navigation buttons left 416a and right 416b.

On the back 402b of the remote control, a fingerprint reader 418 may be integrated to identify the user holding the remote control. Other user identification mechanisms may be used in place of or in conjunction with a fingerprint reader, such as a username or password, a physical key, or other biometric identification. A transmitter 420 communicates with the set-top box, digital video recorder, computer, etc. wirelessly via Bluetooth, infrared, 802.11, WiMAX, wireless USB, etc. A combination microphone and speaker 422 is used to gather audio annotations from a user about the marked video and to play them back to the user to verify that they were recorded properly. This device is exemplary; the user interface, location, shape, and size of buttons and displays, communication and output components, etc. should not be construed as limiting.

Figure 5A:
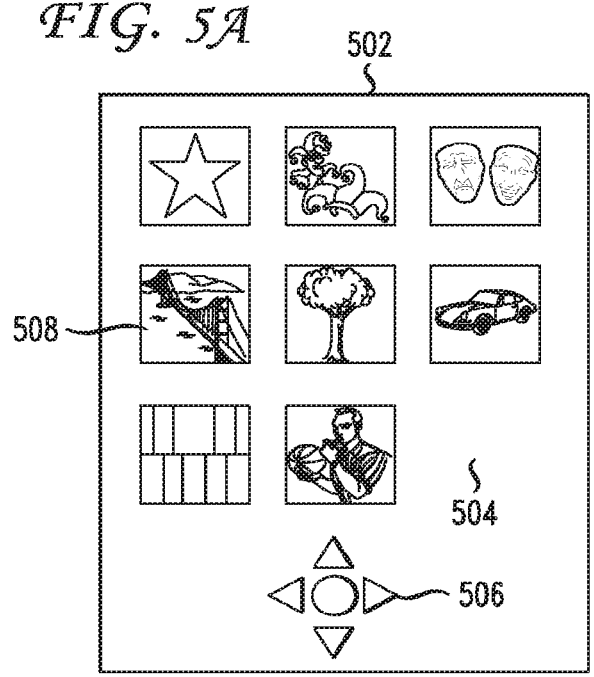
FIG. 5a illustrates a sample user interface for visual browsing of video bookmarks.

FIG. 5a illustrates a sample user interface for visual browsing of video bookmarks. The display 502 is part of a computer, a portable device, a set-top box, etc. On the display are shown a list of video thumbnails 504 representing a list of video bookmarks. The shown arrangement of video thumbnails is only exemplary; other arrangements and layouts may be used, including arrangements where video thumbnails move from place to place on the display or overlap wholly or partially. The individual video thumbnails may be a mix of still frames, slide shows of individual still frames, or full motion video clips. Directional buttons and a selection button 506 are shown as touchscreen buttons such as on a PDA, but the user interface for browsing items on the display may be hardware buttons, touchscreen, a combination, or any other suitable interface. When the user selects a video thumbnail for playback 508, the list of video thumbnails is replaced with the video clip represented by the selected video thumbnail. After the video clip is played, the user may be presented with options to provide additional audio or text annotations, replay the video clip, return to the list of video thumbnails, or the display may return automatically to the list of video thumbnails.

Figure 5B:
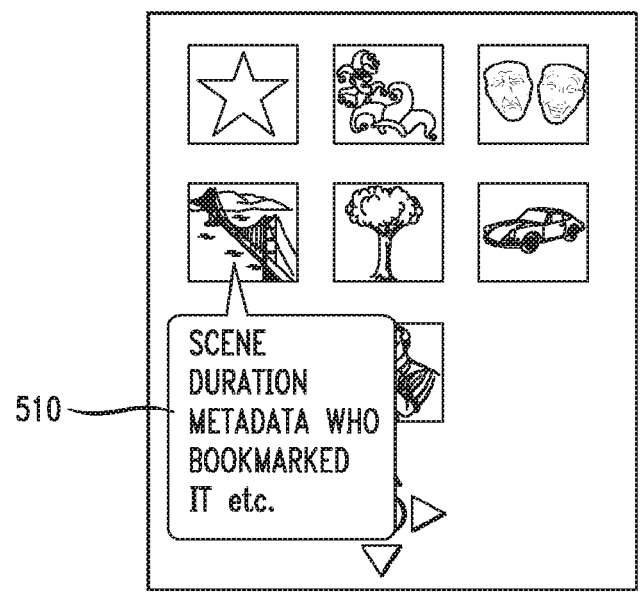
FIG. 5b illustrates a sample user interface for visual browsing of video bookmarks where a user views additional information.

FIG. 5b illustrates a sample user interface for visual browsing of video bookmarks where a user views additional information. A user may select a video thumbnail to display further information to determine if it is the clip the user wants to view. In that case, an overlaid display 510 may be shown over the list of video thumbnails showing all or part of the metadata contained in the video bookmark.

Another sample application is a system that pushes video bookmarks to a photo frame or other remote display. Grandparents could authorize their photo frame to accept from a network connection one or more feed of video bookmarks driven by their children or grandchildren. The authorization may be limited to video bookmarks containing certain metadata information or other tags. For example, the grandparents above select that only video bookmarks with their grandchild's name, Tom, are displayed. The grandchild's video bookmark feed contains numerous unrelated bookmarks, only the bookmarks containing "Tom" in the metadata, file name, description, etc. are displayed. When the grandparents see a video bookmark they like, they push a button or send some other user input to the photo frame or a remote control device and the photo frame displays the video clip represented by the video bookmark. In a similar fashion, a screensaver on a computer or mobile phone could be composed of one or more video bookmarks.

Figure 6:
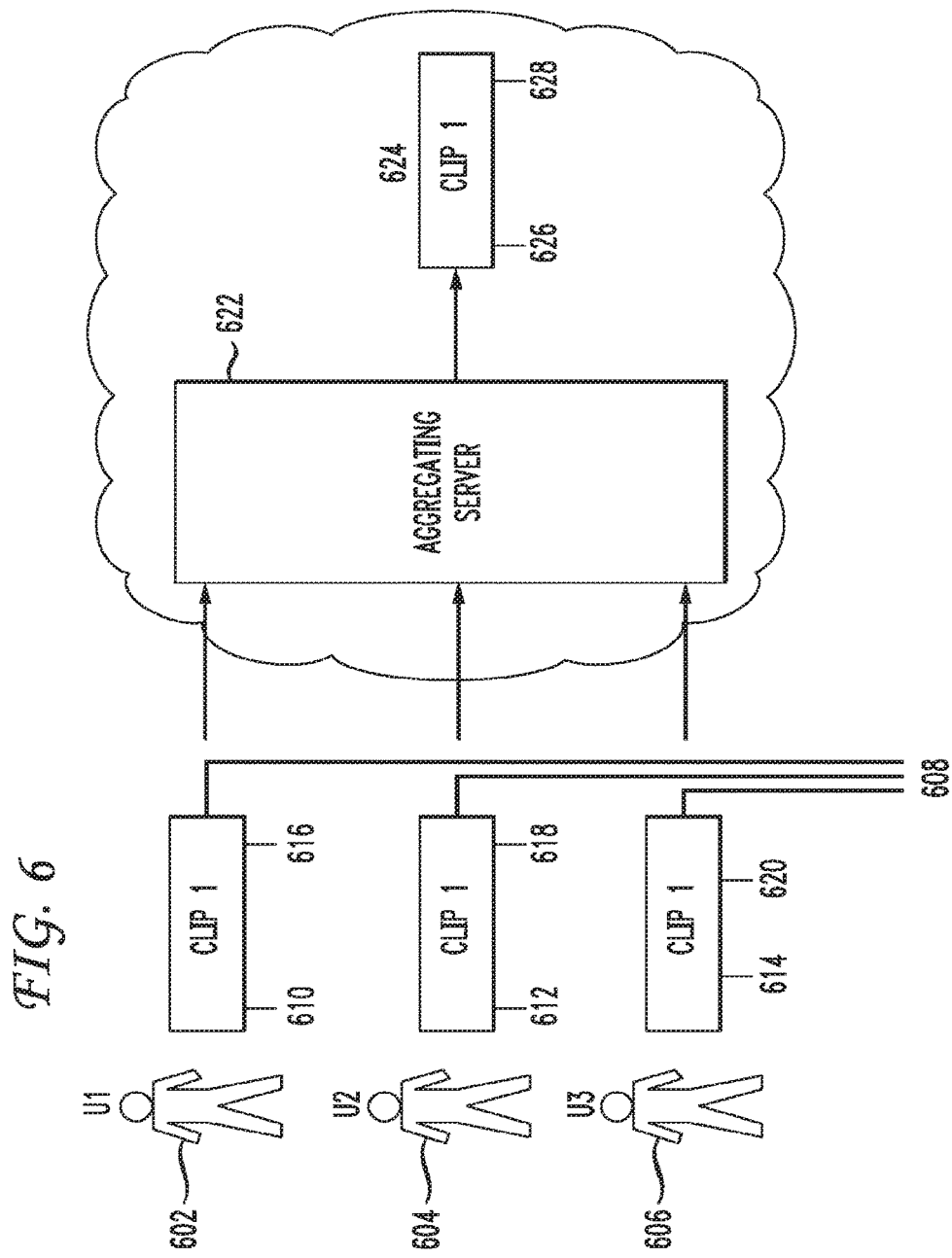
FIG. 6 illustrates a system to normalize place markers from aggregated video bookmarks.

FIG. 6 illustrates a system to normalize place markers from aggregated video bookmarks. User 1 602, User 2 604, and User 3 606 all view clip 1 608. User 1 sets a first mark 610 near the beginning of the video. User 2 sets a first mark 612 near the beginning of the video. User 3 sets a first mark 614 closer to the middle of the video. Similarly, User 1 sets a second mark 616 near the end of the video. User 2 sets a second mark 618 near the end of the video. User 3 sets a second mark 620 not as near the end of the video. The marks set by User 1, User 2, and User 3 are sent to an aggregating server 622. The aggregating server is shown as being within a network cloud. The aggregating server may reside in or across a network. The aggregating server may be composed of multiple servers which communicate with each other. YouTube is one potential application where an aggregating server can be used. YouTube serves millions of video clips each day, often serving the same clip to many users. YouTube, or a similar website, can be expanded to allow multiple users to mark favorite portions of a clip 610, 616, 612, 618, 614, 620 to YouTube, an aggregating server 622.

The aggregating server analyzes the marks sent from one or more users as well as the clip to which the marks are applied. Based on the analysis, the aggregating server determines for clip 1 624 a most probable correct first mark 626 and second mark 628. In this case, because two out of three users had a first mark near the beginning, the aggregating server determined that the most likely correct placement was near the beginning. The same fundamental analysis is performed on the second mark. In one aspect, an aggregating server receives marks from many individuals which apply to many videos. The aggregating server uses a threshold distance between multiple first and multiple second marks to determine if they are intended to mark the same video segment. For example, one clip starts at time 1:30 and runs to time 5:15 while another clip starts at time 1:35 and runs to time 5:00. The clips vary by a few seconds in the beginning and end, but if they are within the threshold, the aggregating server will consider them as containing the same basic video content. A clip starting at time 7:30 and ending at time 15:00 and a clip starting at time 4:10 and ending at time 30:30 are not within the threshold of similarity in this example and are considered as different video clips. The threshold may be set dynamically or statically, by a user or automatically. Clip 1 624 may be stored in the network or may be pushed by the aggregating server 622 back out to individual users 602, 604, 606. While FIG. 6 shows interactions with 3 users, thousands of users or more may submit video bookmarks for aggregation.

In situations with many users, an aggregating server may further recognize a user's sets of interests through metadata contained in submitted video bookmarks and suggest similar or potentially interesting video clips for a particular user.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the processes described herein may have application in digital video recorders, cable or broadcast television, video streams on the Internet, or teaching materials like slides or lectures. Those skilled in the art will readily recognize various modifications and changes that may be made to the present invention without following the example embodiments and applications illustrated and described herein, and without departing from the true spirit and scope of the present invention.

What is claimed is:

1. A system, comprising:
    a processor; and
    a computer-readable storage device that stores instructions which, when executed by the processor, cause the processor to perform operations comprising:
        receiving a first place marker and a second place marker, wherein the first place marker and the second place marker are both associated with a segment of media;
        extracting metadata from the segment of media, wherein the metadata differs from video content contained within a video clip;
        generating, based on the metadata, normalized metadata for locating the segment of media;
        storing, in a memory device, the normalized metadata, the first place marker, and the second place marker to yield stored data in the memory device, wherein the stored data comprises the normalized metadata, the first place marker, and the second place marker stored in the memory device; and
        upon receiving a request, retrieving the segment of the media using the stored data in the memory device.

2. The system of claim 1, wherein storing the normalized metadata, the first place marker, and the second place marker comprises storing the normalized metadata, the first place marker, and the second place marker as a media bookmark.

3. The system of claim 2, wherein the computer-readable storage device stores additional instructions which, when executed by the processor, cause the processor to perform operations further comprise: generating a video thumbnail representing the media bookmark.

4. The system of claim 3, wherein the video thumbnail has a fixed length.

5. The system of claim 3, wherein the video thumbnail has a variable length.

6. The system of claim 1, when generating the normalized metadata further comprises normalizing the metadata for locating the segment of media regardless of a format type or a playback device type.

7. A method, comprising:
    receiving a first place marker and a second place marker, wherein the first place marker and the second place marker are both associated with a segment of media;
    extracting, via a processor, metadata from the segment of media, wherein the metadata differs from a video clip;
    generating, via the processor and based on the metadata, normalized metadata for locating the segment of media;
    storing, in a memory device, the normalized metadata, the first place marker, and the second place marker to yield stored data in the memory device, wherein the stored data comprises the normalized metadata, the first place marker, and the second place marker stored in the memory device; and
    upon receiving a request, retrieving the segment of the media using the stored data in the memory device.

8. The method of claim 7, wherein storing the normalized metadata, the first place marker, and the second place marker comprises storing the normalized metadata, the first place marker, and the second place marker as a media bookmark.

9. The method of claim 8, the method further comprising generating a video thumbnail representing the media bookmark.

10. The method of claim 9, wherein the video thumbnail has a fixed length.

11. The method of claim 9, wherein the video thumbnail has a variable length.

12. The method of claim 7, when generating the normalized metadata further comprises normalizing the metadata for locating the segment of media regardless of a format type or a playback device type.

13. A computer-readable storage device storing instructions which, when executed by a processor, cause the processor to perform operations comprising:
    receiving a first place marker and a second place marker, wherein the first place marker and the second place marker are both associated with a segment of media;
    extracting metadata from the segment of media, wherein the metadata differs from a video clip;
    generating, based on the metadata, normalized metadata for locating the segment of media;
    storing, in a memory device, the normalized metadata, the first place marker, and the second place marker to yield stored data in the memory device, wherein the stored data comprises the normalized metadata, the first place marker, and the second place marker stored in the memory device; and
    upon receiving a request, retrieving the segment of the media using the stored data in the memory device.

14. The computer-readable storage device of claim 13, wherein storing the normalized metadata, the first place marker, and the second place marker comprises storing the normalized metadata, the first place marker, and the second place marker as a media bookmark.

15. The computer-readable storage device of claim 14, wherein the computer-readable storage device stores further instructions which, when executed by the processor, cause the processor to perform operations further comprise generating a video thumbnail representing the media bookmark.

16. The computer-readable storage device of claim 15, wherein the video thumbnail has a fixed length.

17. The computer-readable storage device of claim 15, wherein the video thumbnail has a variable length.

18. The computer-readable storage device of claim 13, wherein generating the normalized metadata further comprises normalizing the metadata for locating the segment of media regardless of a format type or a playback device type.

* * * * *